(No Model.)
E. J. BERG.
ELECTRIC MOTOR.
No. 563,440. Patented July 7, 1896.
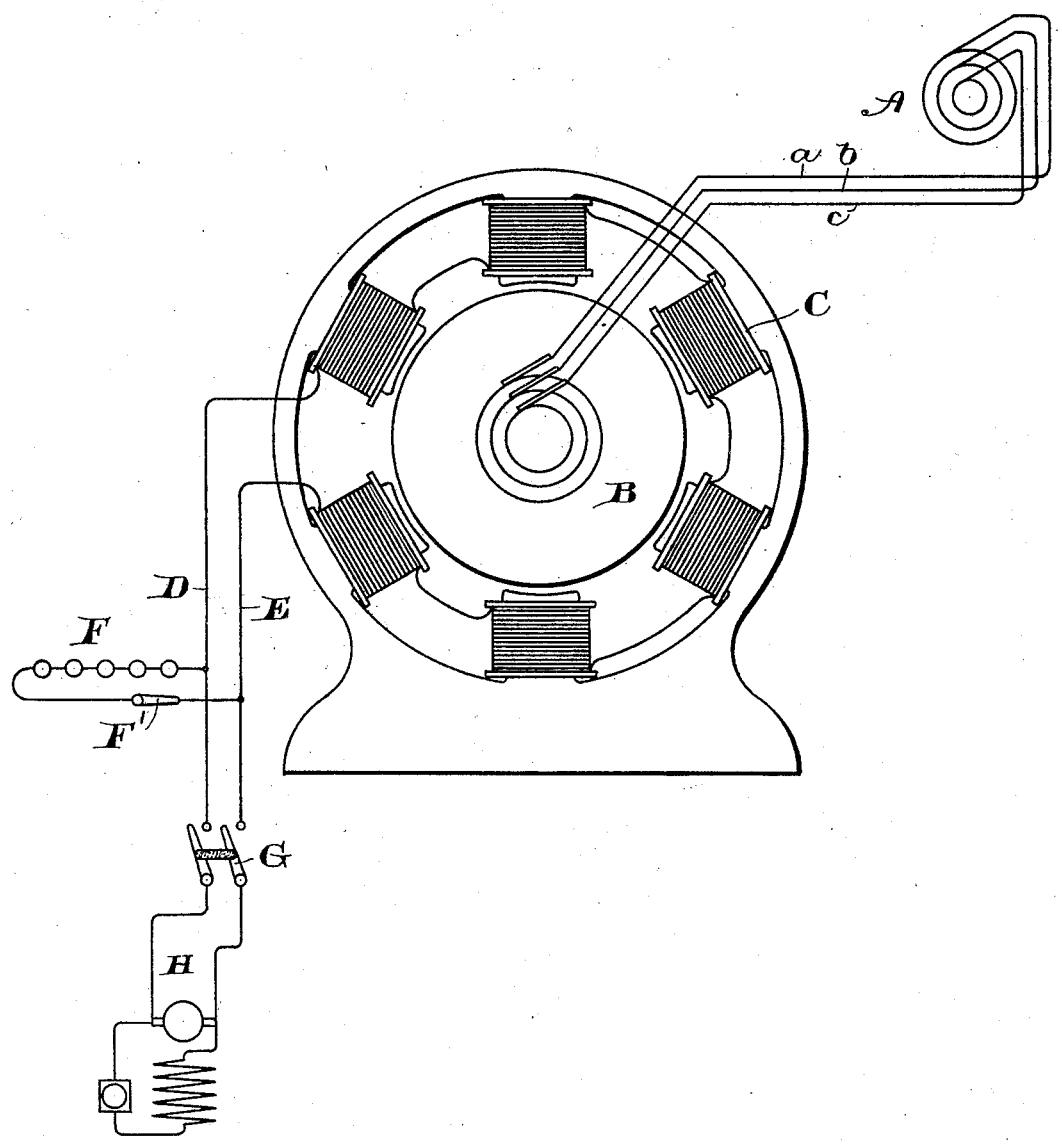
WITNESSES
A. F. Macdonald.
S. W. Tilden
INVENTOR
Ernst J. Berg. by
Geo. R. Blodgett.
atty.

United States Patent Office.

ERNST J. BERG, OF SCHENECTADY, NEW YORK, ASSIGNOR TO THE GENERAL ELECTRIC COMPANY, OF NEW YORK.

ELECTRIC MOTOR.

SPECIFICATION forming part of Letters Patent No. 563,440, dated July 7, 1896.

Application filed October 8, 1895. Serial No. 565,056. (No model.)

*To all whom it may concern:*

Be it known that I, ERNST J. BERG, a subject of the King of Sweden and Norway, residing at Schenectady, in the county of Schenectady and State of New York, have invented certain new and useful Improvements in Synchronizing Electric Motors, (Case No. 281,) of which the following is a specification.

My invention relates to alternating-current electric motors, and has for its object to provide a simple and efficient means of indicating synchronism between the armature of such a motor and the generator supplying it with current.

It is well known that synchronous motors, in order to get proper starting effect, are started with the field open-circuited and run up to synchronism, when the field-circuit is closed. It is essential, in order to get the best result, that the field-circuit should be closed when synchronism is reached, but ordinarily it is difficult to ascertain just when this occurs. By my present invention I ascertain this by connecting across the open terminals of the field-circuit one or more incandescent lamps. The field-circuit thus becomes a circuit closed through a very high resistance and acts as a transformer secondary to the motor-armature actuated by the generator-current. As the armature takes speed, however, the current induced in the field gradually runs down until when the armature attains synchronism no electromotive force is induced in the field-circuit and the lamps cease to glow.

The accompanying drawing is a diagrammatic illustration of my invention, in which—

A is a generator of alternating current, illustrated as of the three-phase type, although this is immaterial. *a b c* are the mains leading therefrom to the armature B of the synchronous motor provided with field-magnets C.

D E are the leads from the field-circuit.

F is a group of lamps coupled across the field-circuit and opened or closed by the switch F'. Of these there may be one or more, arranged in series or multiple.

G is the field-switch, and H is the exciter.

The operation of the device will be readily understood from the statement of invention. When the motor is started and the switch F' closed, the lamps burn brightly. As the motor attains speed, their brightness diminishes until they go out, at which time the motor is running in synchronism and the switch G is closed, sending the direct current from the exciter H through the fields. Then the switch F' is opened and the motor is running with full power.

Of course any suitable indicator may be substituted for the lamps, but, as they are cheap and convenient, they form the preferred construction.

The arrangement described thus not only affords a ready means of determining when synchronism occurs, but it prevents any sparking between the field-terminals and also protects the insulation of the field, the alternating currents induced in which may be of extremely high potential, even running up to some thousands of volts, while the insulation of the spools is ordinarily only that necessary for a few hundred volts.

The means of indicating the phasal condition which I prefer is an incandescent lamp, which furnishes, with the requisitely high resistance, a readily-observable indication. This also acts to protect the insulation, because it is a circuit of high resistance across the field-terminals, so limiting the current in the field as to prevent sparking and puncture of the insulation, as above pointed out.

What I claim as new, and desire to secure by Letters Patent of the United States, is—

1. As a means of indicating synchronism of an alternating-current motor, one or more incandescent lamps connected across the field-terminals.

2. In combination, a generator of alternating current, lines leading therefrom, a synchronous motor connected to the lines, one or more incandescent lamps in the field-circuit, and a switch for cutting the lamps out or in.

In witness whereof I have hereunto set my hand this 27th day of September, 1895.

ERNST J. BERG.

Witnesses:
ROBT. G. DUDLEY,
F. M. MERRILL.